(12) United States Patent
Lin

(10) Patent No.: US 7,826,402 B2
(45) Date of Patent: Nov. 2, 2010

(54) SIGNAL TRANSFER SYSTEMS AND METHODS

(75) Inventor: Hsin-Nan Lin, Taipei County (TW)

(73) Assignee: QISDA Corporation, Taoyuan County (TW)

( * ) Notice: Subject to any disclaimer, the term of this patent is extended or adjusted under 35 U.S.C. 154(b) by 404 days.

(21) Appl. No.: 12/052,455

(22) Filed: Mar. 20, 2008

(65) Prior Publication Data

US 2008/0231327 A1    Sep. 25, 2008

(30) Foreign Application Priority Data

Mar. 23, 2007    (TW) .............................. 96110104 A

(51) Int. Cl.
*H04B 1/44* (2006.01)
*H04L 12/40* (2006.01)

(52) U.S. Cl. ...................... 370/282; 370/438
(58) Field of Classification Search ......... 370/250–252, 370/282, 284, 419, 438
See application file for complete search history.

(56) References Cited

U.S. PATENT DOCUMENTS

| 5,710,890 | A | * | 1/1998 | Hermer | ...................... 710/106 |
| 5,907,539 | A | * | 5/1999 | Riley | ........................... 370/282 |
| 6,525,492 | B2 | * | 2/2003 | Ribarich | ..................... 315/291 |
| 2006/0212634 | A1 | * | 9/2006 | Reay et al. | ................... 710/300 |

* cited by examiner

*Primary Examiner*—Hong Cho

(57) ABSTRACT

A signal transfer system. A first device operates with a first voltage and outputs a first signal and a second signal. A protection circuit receives the first and second signals and outputs the first and second signals when the first voltage is greater than or equal to a predetermined voltage, and provides a third signal and a fourth signal when the first voltage is smaller than the predetermined voltage. A delay circuit delays the second and fourth signals to generate a first delay signal and a second delay signal, respectively. A second device operates with the first signal and the first delay signal when the first voltage is greater than or equal to the predetermined voltage, and operates with the third signal and the second delay signal when the first voltage is smaller than the predetermined voltage.

19 Claims, 4 Drawing Sheets

SIGNAL TRANSFER SYSTEMS AND METHODS

BACKGROUND OF THE INVENTION

1. Field of the Invention

The invention relates to signal transfer systems, and more particularly to a signal transfer system with an Inter Integrated Circuit (I²C) bus.

2. Description of the Related Art

An I²C bus is a universal bus standard for integrated circuit (IC). An I²C bus is a two-lined serial bus standard invented by Philips Company, wherein a serial clock (SCL) and a serial data (SDA) are utilized to define receiving and transmitting data between ICs.

FIG. 1 is a schematic diagram illustrating the conventional operation of an I²C bus between ICs. Each IC 110 and 120 has a SCL pin and a SDA pin, wherein the SCL pins of IC 110 and 120 are coupled together through a transmission line 130, and the SDA pins of IC IC 110 and 120 are coupled together through a transmission line 140. IC 110 is a master IC and IC 120 is a slave IC, wherein the control commands from IC 110 is sent to IC 120 via the transmission lines 130 and 140.

However, logic level interference is possible with the SCL signal and SDA signal sent from IC 110, e.g. high logic level is decreased to low logic level, when an operational voltage of the IC 110 is unstable. At this time, if IC 110 still sends the control commands to IC 120 through the transmission lines 130 and 140, IC 120 may operate with incorrect I²C commands due to the interference.

Therefore, a signal transfer system is desired to prevent data error in the I²C bus between ICs, due to unstable operational voltage.

BRIEF SUMMARY OF THE INVENTION

The invention provides a signal transfer system in order to solve the aforementioned problems in the prior art.

The invention discloses a signal transfer system comprising: a first device operated with a first voltage for outputting a first signal and a second signal; a protection circuit for receiving the first and second signals and outputting the first and second signals when the first voltage is greater than or equal to a predetermined voltage, and providing a third signal and a fourth signal when the first voltage is smaller than the predetermined voltage; a delay circuit for delaying the second and fourth signals to generate a first delay signal and a second delay signal respectively; and a second device for operating with the first signal and the first delay signal when the first voltage is greater than or equal to the predetermined voltage, and operating with the third signal and the second delay signal when the first voltage is smaller than the predetermined voltage.

Furthermore, the invention discloses another signal transfer system comprising: a first device operated with a first voltage for outputting a first signal and a second signal; a protection circuit for receiving the first and second signals and outputting the first and second signals when the first voltage is greater than or equal to a predetermined voltage, and providing a third signal and a fourth signal when the first voltage is smaller than the predetermined voltage, wherein the third signal is substantially equal to the fourth signal; and a second device for operating with the first and second signals when the first voltage is greater than or equal to the predetermined voltage, and operating with the third signal and a fifth signal when the first voltage is smaller than the predetermined voltage, wherein the fifth signal is generated by delaying the fourth signal.

Furthermore, the invention discloses a signal transfer method between a first device and a second device comprising: receiving a serial clock (SCL) signal and a serial data (SDA) signal of an Inter Integrated Circuit (I²C) from the first device; detecting a voltage of the first device; determining whether the voltage is smaller than a predetermined voltage; transmitting the serial clock signal and the serial data signal to the second device when the voltage is greater than or equal to a predetermined voltage; and generating a first control signal and a second control signal by delaying the first control signal and transmitting the first control signal and the second control signal to the second device when the first voltage is smaller than the predetermined voltage.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
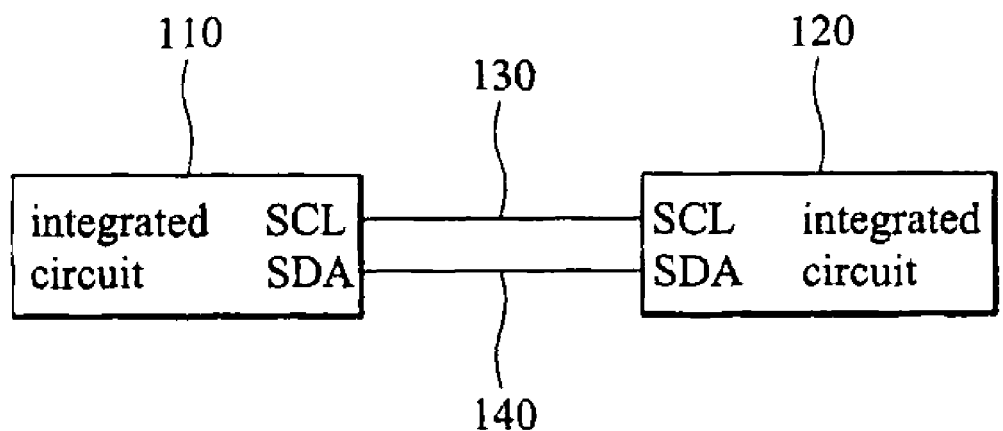
FIG. 1 is a schematic diagram illustrating the conventional operation of an I²C bus between ICs.
Figure 2:
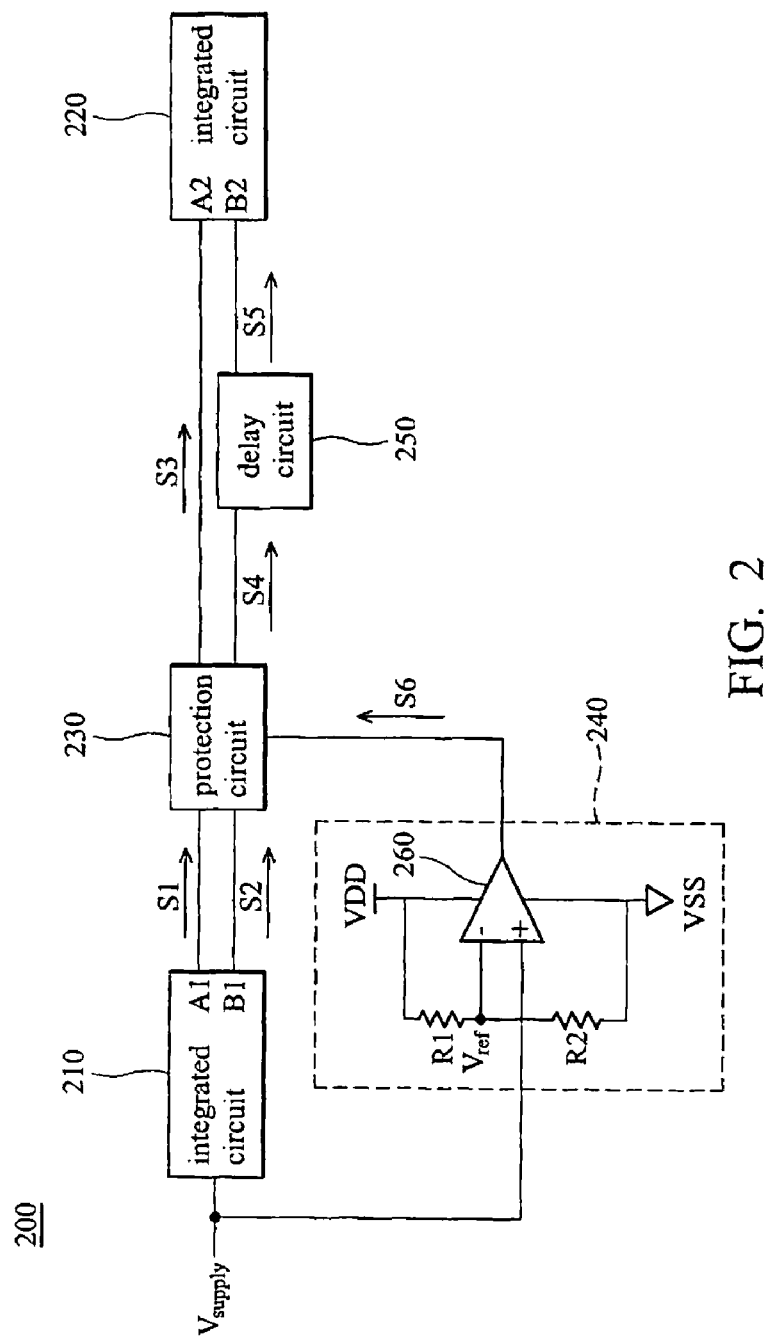
FIG. 2 is a signal transfer system according to an embodiment of the invention.

FIG. 2 is a signal transfer system 200 according to an embodiment of the invention. IC 210 is a master IC, and IC 220 is a slave IC. A protection circuit 230 outputs the signals S3 and S4 according to the signals S1 and S2 received from IC 210 and a detection signal S6 generated by a detection circuit 240. A delay circuit 250 delays the signal S4 to generate a delay signal S5, wherein the delay circuit 250 may be a logic circuit or a circuit composed of resistors and capacitors. The signal S1 is a SCL signal which is transmitted from a terminal A1 of IC 210, and the signal S2 is a SDA signal which is transmitted from a terminal B1 of IC 210. The signal S3 is transmitted to a terminal A2 of IC 220 for receiving the SCL signal, and the delay signal S5 is transmitted to a terminal B2 of IC 220 for receiving the SDA signal. The detection circuit 240 comprises a comparator (i.e. an amplifier) 260 and two resistors R1 and R2, and detects a voltage $V_{supply}$ of IC 210 to generate the detection signal S6.

The resistor R1 is coupled between a voltage VDD and an inverting input terminal of the comparator 260, and the resistor R2 is coupled between a ground VSS and the inverting input terminal of the comparator 260, wherein a signal $V_{ref}$ is determined according to a ratio of the resistors R1 and R2. The voltage $V_{supply}$ is coupled to IC 210 and a non-inverting input terminal of the comparator 260, respectively. The voltage $V_{supply}$ is an operational voltage of IC 210, and the voltage VDD is an operational voltage of the signal transfer system 200, wherein the voltage VDD is greater than the voltage $V_{supply}$. In the detection circuit 240, the detection signal S6 generated from the comparator 260 is a high logic level when the voltage $V_{supply}$ is greater than or equal to the signal $V_{ref}$. On the contrary, if the voltage $V_{supply}$ is smaller than the signal $V_{ref}$, the detection signal S6 is a low logic level.

Figure 3:
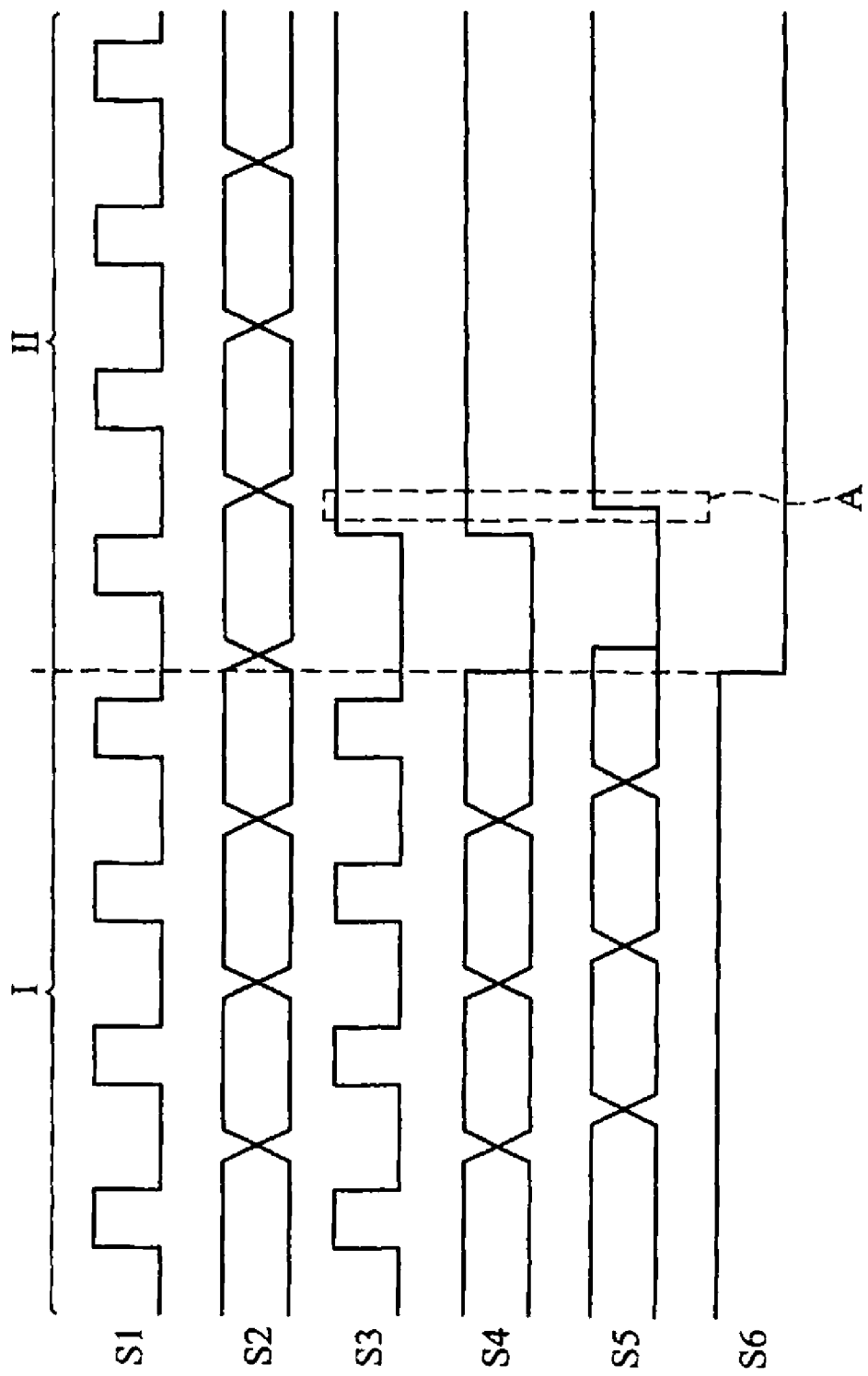
FIG. 3 is a waveform diagram illustrating the signals of the signal transfer system shown in FIG. 2.

FIG. 3 is a waveform diagram illustrated the signals of the signal transfer system 200 shown in FIG. 2. State I indicates that the voltage $V_{supply}$ is greater than or equal to the signal $V_{ref}$, i.e. the operational voltage of IC 210 is stable, and State II indicates that the voltage $V_{supply}$ is smaller than the signal $V_{ref}$, i.e. the operational voltage of IC 210 is unstable. As shown in FIG. 3, in State I, the detection signal S6 is the high logic level. Therefore, the signals S1 and S2 outputted from IC 210 will transmit to IC 220 through the protection circuit 230 and the delay circuit 250. Then, IC 220 may normally operate with the signal S3 and the delay signal S5, i.e. I²C commands sent from IC 210.

Furthermore, in State II, the detection signal S6 is the low logic level. The protection circuit 230 receives the detection signal S6 to determine that the operational voltage of IC 210 is unstable. Thus, the protection circuit 230 will provide the signals S3 and S4 not the signals S1 and S2 to the delay circuit 250 and IC 220. Each signals S3 and S4 is a rising signal, i.e. a voltage level becomes a high logic level from a low logic level. In one embodiment, in State II, the signal S3 is substantially equal to the signal S4. Then, data transfers of I²C bus between IC 220 and IC 210 may be stopped according to the signal S3 and the delay signal S5, which are corresponded to a STOP condition of I²C standard. As shown in dotted line A, in general, a low to high logic level transition on the SDA signal while the SCL signal is the high logic level means the STOP condition of I²C.

Referring to FIG. 2, if the detection circuit 240 detects that the voltage $V_{supply}$ of the master IC 210 is unstable, the protection circuit 230 may stop transmitting the SCL and SDA signals from the master IC 210 to the slave IC 220, and provide the signals corresponding to the STOP condition of I²C to the slave IC 220 with the delay circuit 250, so that the slave IC 220 may stop I²C data transmission between IC 210 and IC 220 according to the signals corresponding to the STOP condition of I²C.

The signal transfer system of the invention is applied to I²C data transmission between various ICs, and is also applied to I²C data transmission between various devices with I²C interface, wherein various devices may comprise ICs and other electronic devices.

Figure 4:
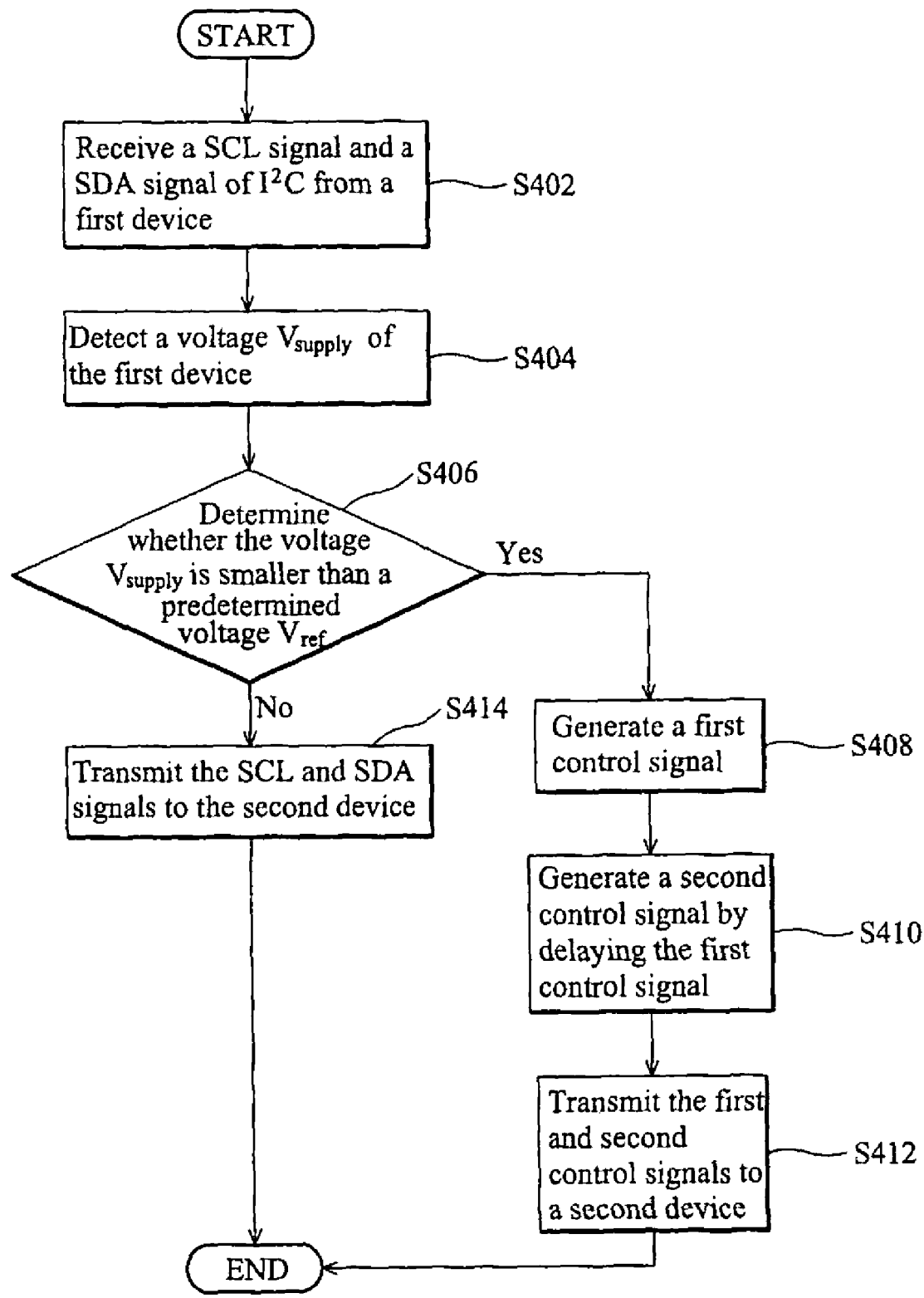
FIG. 4 is a flow chart of a signal transfer method 400 according to an embodiment of the invention.

FIG. 4 is a flow chart of a signal transfer method 400 according to an embodiment of the invention. First, an SCL signal and an SDA signal of an I²C from a first device are received (step S402). Then, a voltage $V_{supply}$ of the first device is detected (step S404) to determine whether the voltage $V_{supply}$ is smaller than a predetermined voltage $V_{ref}$ (step S406). If the voltage $V_{supply}$ is smaller than the predetermined voltage $V_{ref}$, a first control signal is generated (step S408), wherein the first control signal is a rising signal, i.e. a voltage level becomes a high logic level from a low logic level, such as the signals S3 and S4 shown in FIG. 2. A second control signal is then generated by delaying the first control signal (step S410), such as the delay signal S5 shown in FIG. 2, and the first control signal and the second control signal are transmitted to a second device (step S412). On the contrary, the SCL and SDA signals are transmitted to the second device when the voltage $V_{supply}$ is greater than or equal to the predetermined voltage $V_{ref}$ (step S414).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A signal transfer system, comprising:
 a first device operated with a first voltage for outputting a first signal and a second signal;
 a protection circuit receiving the first and second signals and outputting the first and second signals when the first voltage is greater than or equal to a predetermined voltage, and providing a third signal and a fourth signal when the first voltage is smaller than the predetermined voltage;
 a delay circuit delaying the second and fourth signals to generate a first delay signal and a second delay signal respectively; and
 a second device operating with the first signal and the first delay signal when the first voltage is greater than or equal to the predetermined voltage, and operating with the third signal and the second delay signal when the first voltage is smaller than the predetermined voltage.

2. The signal transfer system as claimed in claim 1, further comprising a detection circuit generating a first detection signal and a second detection signal, wherein the detection circuit outputs the first detection signal to the protection circuit when the first voltage is greater than or equal to the predetermined voltage, and wherein the detection circuit outputs the second detection signal to the protection circuit when the first voltage is smaller than the predetermined voltage.

3. The signal transfer system as claimed in claim 2, wherein the detection circuit comprises:
 an amplifier having a first input terminal, a second input terminal coupled to the first voltage and an output terminal for outputting the first detection signal and the second detection signal;
 a first resistor coupled between a second voltage and the first input terminal; and
 a second resistor coupled between a ground and the first input terminal.

4. The signal transfer system as claimed in claim 3, wherein the predetermined voltage is determined according to a ratio of the first resistor and the second resistor.

5. The signal transfer system as claimed in claim 3, wherein the second voltage is greater than the first voltage.

6. The signal transfer system as claimed in claim 1, wherein the delay circuit is one of a logic circuit and a circuit composed of resistors and capacitors.

7. The signal transfer system as claimed in claim 1, wherein the first signal and the second signal are a serial clock (SCL) signal and a serial data (SDA) signal of Inter Integrated Circuit (I²C) bus, respectively.

8. The signal transfer system as claimed in claim 1, wherein the third signal is substantially equal to the fourth signal.

9. The signal transfer system as claimed in claim 8, wherein the third signal is a rising signal, and wherein the third signal and the second delay signal are corresponded to a STOP condition of I²C standard, and data transfers between the first device and the second device are stopped according to the third signal and the second delay signal.

10. A signal transfer system, comprising:
 a first device operated with a first voltage for outputting a first signal and a second signal;
 a protection circuit receiving the first and second signals and outputting the first and second signals when the first voltage is greater than or equal to a predetermined voltage, and providing a third signal and a fourth signal when the first voltage is smaller than the predetermined voltage, wherein the third signal is substantially equal to the fourth signal; and a second device operating with the first and second signals when the first voltage is greater than or equal to the predetermined voltage, and operating with the third signal and a fifth signal when the first voltage is smaller than the predetermined voltage, wherein the fifth signal is generated by delaying the fourth signal.

11. The signal transfer system as claimed in claim 10, further comprising a detection circuit generating a first detection signal and a second detection signal, wherein the detection circuit outputs the first detection signal to the protection circuit when the first voltage is greater than or equal to the predetermined voltage, and wherein the detection circuit outputs the second detection signal to the protection circuit when the first voltage is smaller than the predetermined voltage.

12. The signal transfer system as claimed in claim 11, wherein the detection circuit comprises:

an amplifier having a first input terminal, a second input terminal coupled to the first voltage and an output terminal for outputting the first detection signal and the second detection signal;

a first resistor coupled between a second voltage and the first input terminal; and a second resistor coupled between a ground and the first input terminal.

13. The signal transfer system as claimed in claim 12, wherein the predetermined voltage is determined according to a ratio of the first resistor and the second resistor.

14. The signal transfer system as claimed in claim 12, wherein the second voltage is greater than the first voltage.

15. The signal transfer system as claimed in claim 10, further comprising a delay circuit for delaying the fourth signal to generate the fifth signal.

16. The signal transfer system as claimed in claim 15, wherein the delay circuit is one of a logic circuit and a circuit composed of resistors and capacitors.

17. The signal transfer system as claimed in claim 10, wherein the third signal is a rising signal, and wherein the third signal and the fifth signal are corresponded to a STOP condition of $I^2C$ standard, and data transfers between the first device and the second device are stopped according to the third signal and the fifth signal.

18. A signal transfer method between a first device and a second device, the method comprising:

receiving a serial clock (SCL) signal and a serial data (SDA) signal of Inter Integrated Circuit ($I^2C$) from the first device;

detecting a voltage of the first device;

determining whether the voltage is smaller than a predetermined voltage;

transmitting the serial clock signal and the serial data signal to the second device when the voltage is greater than or equal to a predetermined voltage; and generating a first control signal and a second control signal by delaying the first control signal and transmitting the first control signal and the second control signal to the second device when the first voltage is smaller than the predetermined voltage.

19. The signal transfer method as claimed in claim 18, wherein the first control signal is a rising signal, and wherein the first control signal and the second control signal are corresponded to a STOP condition of $I^2C$ standard, and data transfers between the first device and the second device are stopped according to the first control signal and the second control signal.

* * * * *